United States Patent
Donderici et al.

(10) Patent No.: US 10,443,371 B2
(45) Date of Patent: Oct. 15, 2019

(54) DIRECTIONAL BUTTON EXCITATION FOR RANGING APPLICATIONS

(71) Applicant: Halliburton Energy Services, Inc., Houston, TX (US)

(72) Inventors: Burkay Donderici, Houston, TX (US); Baris Guner, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 75 days.

(21) Appl. No.: 15/534,263

(22) PCT Filed: Sep. 19, 2016

(86) PCT No.: PCT/US2016/052506
§ 371 (c)(1),
(2) Date: Jun. 8, 2017

(87) PCT Pub. No.: WO2018/052453
PCT Pub. Date: Mar. 22, 2018

(65) Prior Publication Data
US 2018/0258755 A1    Sep. 13, 2018

(51) Int. Cl.
*E21B 47/022* (2012.01)
*G01V 3/26* (2006.01)
(Continued)

(52) U.S. Cl.
CPC .......... *E21B 47/02216* (2013.01); *G01V 3/26* (2013.01); *E21B 7/04* (2013.01); *E21B 43/2408* (2013.01)

(58) Field of Classification Search
CPC ............................ E21B 47/02216; G01V 3/26
(Continued)

(56) References Cited

U.S. PATENT DOCUMENTS

| 2004/0245991 A1 | 12/2004 | Hayman et al. |
| 2005/0067190 A1 | 3/2005 | Tabanou et al. |

(Continued)

FOREIGN PATENT DOCUMENTS

WO    2015/084379 A1    6/2015

OTHER PUBLICATIONS

Kuckes, Arthur F., et al. "An electromagnetic survey method for directionally drilling a relief well into a blown out oil or gas well." Society of Petroleum Engineers Journal 24.03, (1984): 269-274.

(Continued)

*Primary Examiner* — Taras P Bemko
(74) *Attorney, Agent, or Firm* — Jason Sedano; Baker Botts L.L.P.

(57) ABSTRACT

The structural integrity and reliability of a downhole tool or mandrel may be improved by implementation of a design and configuration that does not require several separate components to be coupled together. A button recessed within an insulation layer may be installed within a groove or recess of the downhole tool. The isolation layer electrically isolates the button from the downhole tool. The button and the isolation layer are installed such that the top surface of either does not extend beyond the outer surface of the downhole tool. Recessing the button and isolation layer in this manner prevents undue wear on the downhole tool as well as the button and isolation layer. The buttons may be arranged so that when excited the buttons may detect the presence of a target objects located at various distances, directions, and orientations from the downhole tool.

33 Claims, 6 Drawing Sheets

(51) Int. Cl.
*E21B 7/04* (2006.01)
*E21B 43/24* (2006.01)

(58) Field of Classification Search
USPC .......................................................... 175/45
See application file for complete search history.

(56) References Cited

U.S. PATENT DOCUMENTS

2009/0178850 A1 7/2009 Waters et al.
2011/0031972 A1* 2/2011 Pelletier ................ E21B 47/102
 324/324
2015/0268371 A1 9/2015 Donderici et al.

OTHER PUBLICATIONS

Bittar, Michael S., Hsu-Hsiang Wu, and Shanjun Li. "New Logging While Drilling Ranging Technique for SAGD: Theory and Experiment." SPE Annual Technical Conference and Exhibition. Society of Petroleum Engineers, 2012.
International Search Report and Written Opinion issued in related PCT Application No. PCT/US2016/052506 dated May 10, 2017, 20 pages.

* cited by examiner

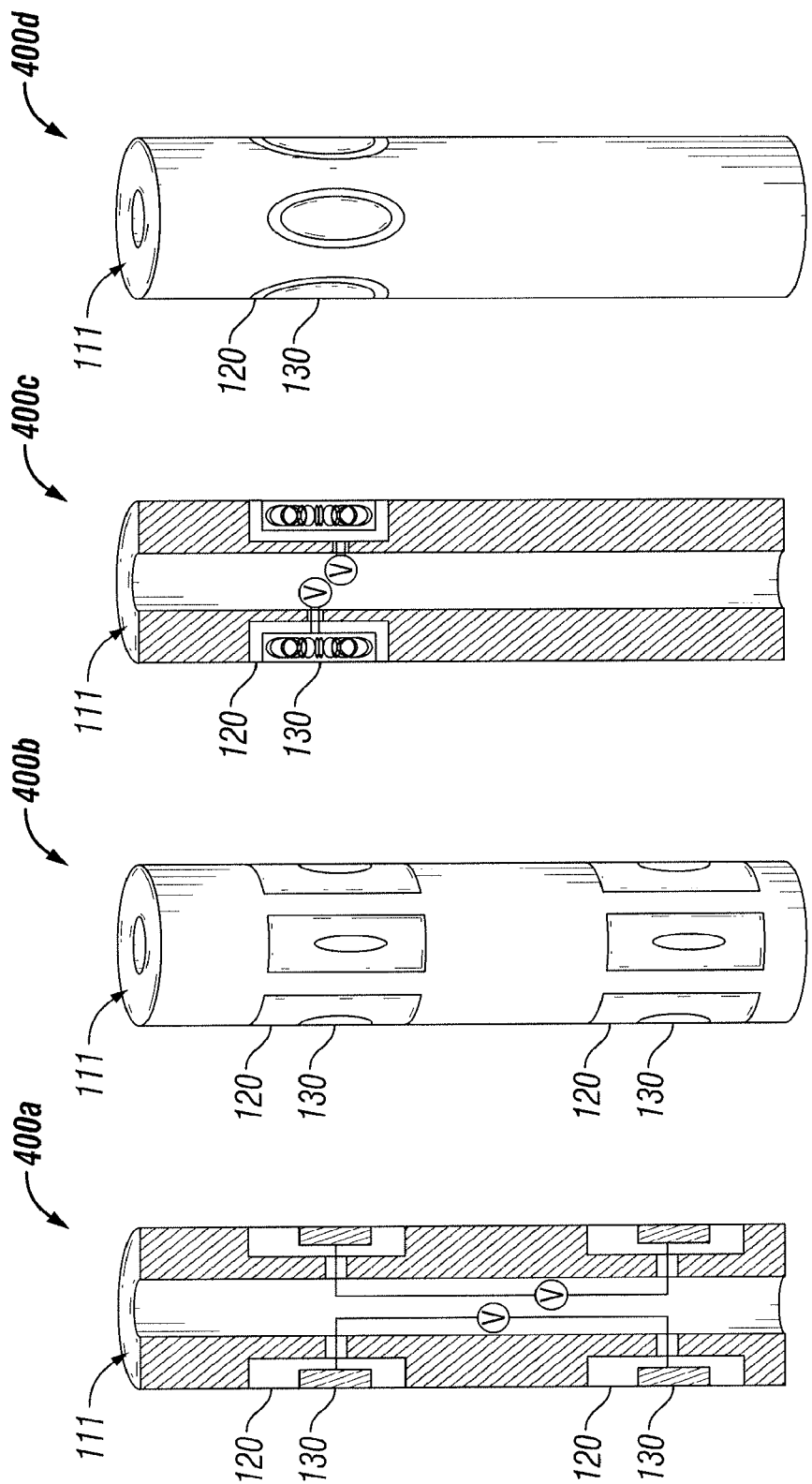

DIRECTIONAL BUTTON EXCITATION FOR RANGING APPLICATIONS

CROSS-REFERENCE TO RELATED APPLICATION

The present application is a U.S. National Stage Application of International Application No. PCT/US2016/052506 filed Sep. 19, 2016, which is incorporated herein by reference in its entirety for all purposes.

BACKGROUND

The present disclosure relates generally to well drilling operations and, more particularly, to directional button excitation for ranging applications.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Ranging tools are used to determine the position, direction and orientation of a conductive pipe (for example, a metallic casing) for a variety of applications. In certain instances, such as in a blowout, it may be necessary to intersect a first well, called a target well, with a second well, called a relief well. The second well may be drilled for the purpose of intersecting the target well, for example, to relieve pressure from the blowout well. In certain instances, such as a crowded oil field, it may be necessary to identify the location of multiple wells to avoid collision incidents. In certain instances, a ranging tool is used to drill a parallel well to an existing well, for example, in steam assist gravity drainage (SAGD) well structures. In certain instances, a ranging tool is used to track an underground drilling path using a current injected metallic pipe over the ground as a reference. Traditional electrode sources, for example, for a mandrel, require insulating gap subs in ranging tool designs to prevent the source and return electrodes from effectively being shorted. It can be difficult to maintain structural integrity and reliability of the ranging tool due to these insulating gap subs.

FIGURES

Some specific exemplary embodiments of the disclosure may be understood by referring, in part, to the following description and the accompanying drawings.

FIG. 4A is a diagram illustrating a cross-sectional view of an example button ranging system using direct excitation of the button, according to aspects of the present disclosure.

FIG. 4B is a diagram illustrating a front view of an example button ranging system using direct excitation of the button, according to aspects of the present disclosure.

FIG. 4C is a diagram illustrating a cross-sectional view of an example button ranging system using toroidal excitation of the button, according to aspects of the present disclosure.

FIG. 4D is a diagram illustrating a front view of an example button ranging system using toroidal excitation of the button, according to aspects of the present disclosure.

Figure 1:
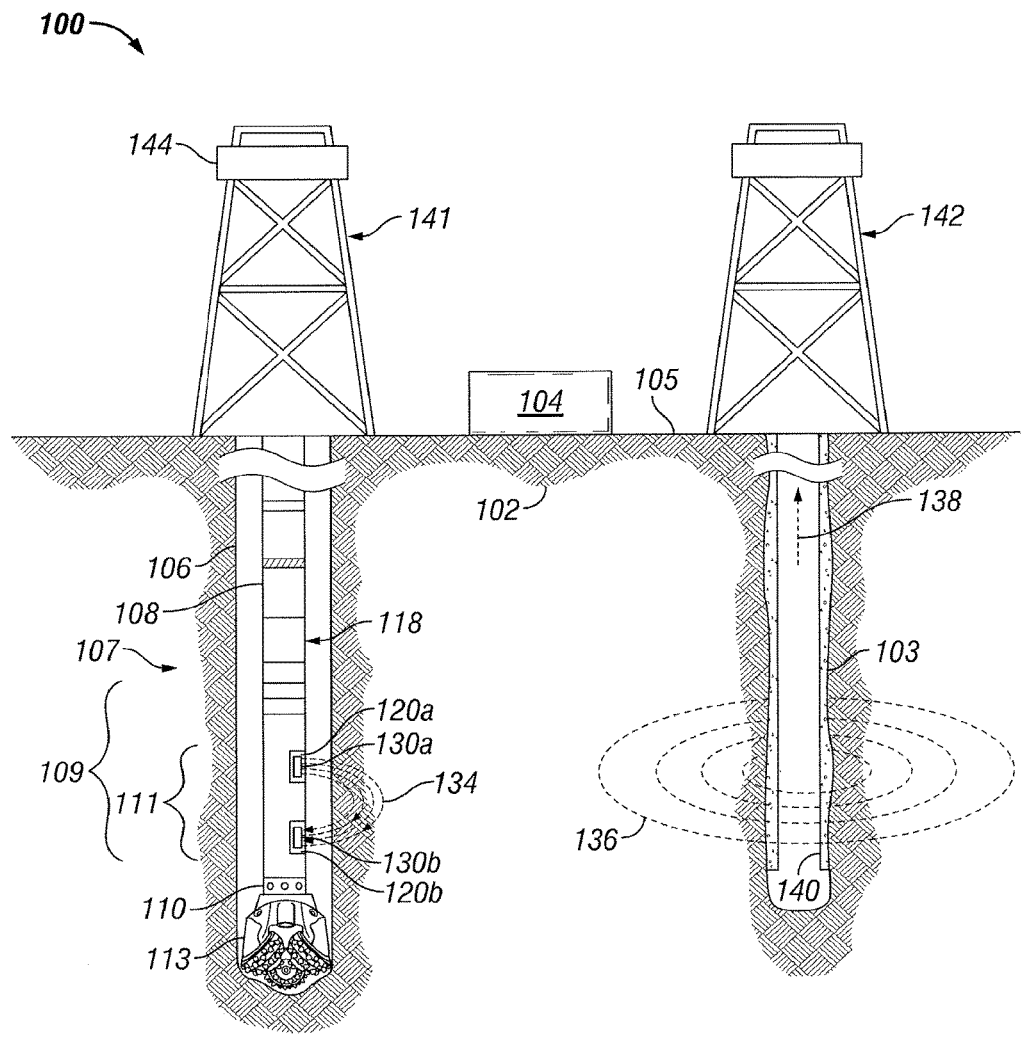
FIG. 1 is a diagram illustrating an example ranging system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to directional button excitation for ranging measurements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging while drilling ("LWD") and measurement—while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

There exist different approaches for obtaining current on the target object to perform ranging operations and for taking ranging measurements. Ranging tools may be used to determine the position, orientation and direction of a target object that is conductive, for example, the metallic casing of a target object or well. In one approach, an electrode type source is used to induce current on the target object. This current then induces a secondary magnetic field which can be measured by the receivers on the ranging tool. Based on the strength of the magnetic field, location of the target object may be determined, for example. Alternatively, gradient of the magnetic field radiated by the target object in addition to the magnetic field itself may also be measured. By using a relationship between the magnetic field and its gradient, a ranging measurement may be made.

In existing ranging tools that use direct excitation, electrodes are located directly on the mandrel which may alter the integrity or strength of the mandrel. This is an important consideration given the amount of stress on the mandrel during drilling operations, for example, logging while drilling operations. If the electrodes are located on an exterior surface of the mandrel the source and return electrodes would effectively be shorted necessitating the use of insulating gap subs which may also affect electrical connections producing difficulties in design and reduced reliability of the ranging tool. One or more embodiments of the present disclosure locate buttons within an isolation layer where the isolation layer is within a groove or recess of a mandrel or downhole tool. The buttons may be excited via direct excitation or toroidal excitation. The isolation layer ensures that there is no direct coupling from the electrodes to the mandrel which may significantly reduce the currents on the mandrel. These buttons have partial azimuthal coverage as the buttons may not wrap entirely around the mandrel. Currents are forced to a certain azimuthal direction allowing for directional measurements. Thus, effective mandrel isolation is accomplished, comparable to that of a gap sub, with the benefit that the structural strength and integrity and reliability of the downhole tool are improved.

FIG. 1 is a diagram illustrating an example drilling and ranging system environment 100, according to aspects of the present disclosure. The environment 100 includes rig 144 at the surface 105 and positioned above borehole 106 within a subterranean formation 102. Rig 144 may be coupled to a drilling assembly 107, comprising drill string 108 and bottom hole assembly (BHA) 109. The BHA 109 may comprise a drill bit 113 and a downhole tool 111. The downhole tool 111 may be any type of downhole tool 111 including, but not limited to, a MWD, an LWD, ranging tool, sensors, a galvanic tool, etc. In certain embodiments, the drilling assembly 107 may be rotated by a top drive mechanism (not shown) to rotate the drill bit 113 and extend the borehole 106. In certain other embodiments, a downhole motor (not shown), such as a mud motor, may be included to rotate the drill bit 113 and extend the borehole 106 without rotating the drilling assembly 107. In other embodiments, such as in an offshore drilling operation, the surface 105 may be separated from the rig 144 by a volume of water.

As used herein, a galvanic tool may comprise any tool with electrodes through which current is injected into a subterranean formation and a voltage response of the formation to the injected current is measured. As the bit extends the borehole 106 through the formation 102, the downhole tool 111 may collect resistivity measurements relating to borehole 106, the borehole 103 and the formation 102. In certain embodiments, the orientation and position of the downhole tool 111 may be tracked using, for example, an azimuthal orientation indicator, which may include magnetometers, inclinometers, and/or accelerometers, though other sensor types such as gyroscopes may be used in some embodiments.

Ranging operations may require that a location of a target object, for example, a conductive target, be identified. In the embodiment shown, the target object comprises a target well 142 for a second borehole 103. The borehole 103 may comprise a casing 140 containing or composed of an electrically conductive member such as casing, liner or a drill string or any portion thereof that has had a blowout or that needs to be intersected, followed, tracked or avoided. In the embodiment shown, the borehole 103 includes an electrically conductive casing 140. Identifying the location of the target well 142, with respect to the drilling well 141, with conductive casing 140 may comprise taking various measurements and determining a direction of the target well 142 and borehole 103 relative to the borehole 106. These measurements may comprise measurements of electromagnetic fields in the formation using the buttons 130. Magnetic field measurements may identify the distance, orientation and direction to the target well 142.

In certain embodiments, performing ranging measurements may include inducing an electromagnetic (EM) field within the second borehole 103. In the embodiment shown, inducing a magnetic field within the borehole comprises injecting a formation current 134 into the formation 102 by exciting a source button 130a and returning at return button 130b where the buttons 130 are isolated from the BHA 109 or downhole tool 111 by an isolation layer 120. Part of the induced formation current 134 may be received and concentrated at the casing 140 within the target well 142, shown as current 138, and the current 138 on the casing 140 may induce a magnetic field 136 in an azimuthal direction from the direction of the flow of the electric current 138. Formation current 134 may be induced within the formation 102 by energizing the source button 130a of the drilling assembly 107 according to a control signal that specifics signal characteristics for the formation current 134. The formation current 134 may comprise, for example, an alternating current electrical signal. The source button 130a may be insulated from the BHA 109 and excited directly, or electrically connected to or a part of the BHA and excited electromagnetically with a toroidal winding. Part of the induced formation current 134 may be received and concentrated at the casing 140 within the target well 142, shown as current 138, and the current 138 on the casing 140 may induce a magnetic field 136 in an azimuthal direction with respect to the direction of the flow of the electric current 138. A magnetic field 136 created by the target object or target well 142 may be proportional to the current flowing into the formation.

In particular, the drilling assembly 107 includes grooves or recesses which allow for installation of isolation layers 120. Buttons 130 may be buttons which are installed within the isolation layers 120 and excited directly (direct excitation). While buttons 130 are shown as being excited using direct excitation, in other embodiments, buttons 130 may be electrically connected to or a part of the BHA 109 and excited electromagnetically with a toroidal winding (toroidal excitation). The direct excitation may work at lower frequencies compared to the toroidal excitation, however toroidal excitation provides higher structural integrity as total isolation from the mandrel is not required. Isolation layers 120 may aid current to flow into the formation 102. The isolation layers 120 and buttons 130 may be installed within any one or more portions of the downhole tool 111. The isolation layers 120 and buttons 130 are installed such that no cut that slices the mandrel, downhole tool 111, BHA 109, etc. need be made as the isolation layers 120 and buttons 130 are installed within a groove or recess. In any embodiment, the isolation layers 120 and buttons 130 may be located at a top portion of the downhole tool 111 and/or a bottom portion of the downhole tool 111 and/or any location in between. In other embodiments, the isolation layers 120 and buttons 130 may be located within any downhole tool, mandrel, LWD, MWD, BHA 109, or any other component or element of drill string 108. Buttons 130 may comprise a source button 130a located at an isolation layer 120a and a return button 130b located at an isolation layer 120b. The isolation layers 120 electrically isolate the buttons 130 from the downhole tool 111.

The source button 130a may comprise an antenna and the formation current 134 may comprise a time-varying electromagnetic field that is emitted from the source button 130a. The receivers 110 may comprise but are not limited to an induction type sensor, a Hall Effect magnetometer sensor, a magnetic gradiometer or a combination or pair of any of the magnetometers listed above or any other type of sensor or combination of sensors known to one of ordinary skill in the art. Likewise, the receivers 110 may be uniaxial, biaxial, or triaxial, and also may be a flux-gate, solenoid, or coil type sensor. In certain embodiments, an isolation layer 120 and corresponding installed button 130 may be positioned at various locations along the BHA 109, or above the BHA 109, such as between the drill string 108 and the BHA 109. The orientation of the buttons 130 may be reversed, for example, the source button 130a may be located closer to the drill bit 113 or closer to the surface 105 in relation to the return button 130b. It may be advantageous to position the buttons 130 as close to the bottom of the borehole 106 as possible. It may be advantageous to locate the source button 130a and return button 130b as far apart as possible or to locate the source button 130a and return button 130b within a predefined range. Similarly, receivers 110 may be located at any suitable location along or at any component of drill string 108.

A hole in the isolation layers 120 and the downhole tool 111 or any other part of the BHA 109 or drilling assembly 107 may be utilized to permit a wire (not shown) to couple to the source buttons 130a to excite (for example, direct the formation current 134) the source buttons 130a. In any embodiment, the source button 130a may be located on the order of 10-200 feet from the return button 130b or at any range greater, lesser or in between.

In certain embodiments, performing ranging measurements may include inducing an electromagnetic (EM) field within the second borehole 103 based, at least in part, on a formation current 134 injected into the formation 102. In the embodiment shown, inducing an electromagnetic field within the borehole 103 comprises injecting a formation current 134 by exciting a source button 130a to induce current to flow into the formation and return at return button 130b. The source of the excitation may be a voltage or a current. Buttons 130 may be components of the downhole tool 111, BHA 109, or any other downhole component. Formation current 134 may be induced within the formation 102 by energizing the source button 130a of the drilling assembly 107 according to a control signal that specifies signal characteristics for the formation current 134. The formation current 134 may comprise, for example, an alternating current electrical signal. Part of the formation current 134 may be received and concentrated at the casing 140 within the conductive target (target well 142), shown as current 138, and the current 138 on the casing 140 may induce a magnetic field 136 in an azimuthal direction with respect to the direction of the flow of the electric current 138. A magnetic field 136 created by the conductive target or casing 140 may be proportional to the current flowing into the formation 102; strength of this magnetic field 136 decreases as the radial distance from the conductive target or casing 140 increases.

In certain embodiments, a system control unit 104 may be positioned at the surface 105 as depicted in FIG. 1 and may be communicably or communicatively coupled to downhole elements including, but not limited to, drilling assembly 107, telemetry system 118, downhole tool 111, and BHA 109. In other embodiments, a system control unit 104 may be positioned below the surface 105 (not shown) and may communicate data to another system control unit 104 or any other system capable of receiving data from the system control unit 104. For example, the control unit 104 may be communicably coupled to the downhole tool 111, electrodes 130, drill bit 113, or any other component through a telemetry system 118. The telemetry system 118 may be incorporated into the BHA 109 or any other downhole component of drilling assembly 107 and may comprise a mud pulse type telemetry system that transmits information between the surface system control unit 104 and downhole elements via pressure pulses in drilling mud. Although the system control unit 104 is positioned at the surface 105 in FIG. 1, certain processing, memory, and control elements may be positioned within the drilling assembly 107. Additionally, various other communication schemes may be used to transmit communications to/from the system control unit 104, including wireline configurations and wireless configurations.

In certain embodiments, the system control unit 104 may comprise an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The formation current 134 may be injected into the formation 102 by excitation of the source button 130a. In certain embodiments, the system control unit 104 may excite the source button 130a by sending a command downhole to the downhole tool 111 or a controller associated with the downhole tool 111. The command(s) may cause the downhole tool 111 to excite the source button 130a. In other embodiments, the source button 130a is excited by a downhole source located at or associated with the downhole tool 111. In one or more embodiments the source of excitation may be located downhole or at the surface 105.

In certain embodiments, the signal characteristics of the formation current 134 may be based at least in part on at least one downhole characteristics within the borehole 106 and formation 102, including a noise level within the formation 102; a frequency transfer function of the source button 130a, the return button 130b, and the formation 102; and a frequency response of the target object. The noise level within the formation 102 may be measured downhole using electromagnetic or acoustic receivers coupled to the drilling assembly, for example. The frequency transfer function and the frequency response of the target borehole 103 may be determined based on various mathematical models, or may be extrapolated from previous ranging measurements. In certain embodiments, the system control unit 104 may further send commands to any one or more of receivers 110 to cause any one or more of the receivers 110 to measure the induced magnetic field 136 on the second borehole 103. Like the source button 130a, the receivers 110 may be coupled to a downhole controller, and the commands from the system control unit 104 may control, for example, when the measurements are taken. In certain embodiments, the system control unit 104 may determine and set a sampling rate of the induced magnetic field 136, as will be described below. Additionally, measurements taken by the one or more receivers 110 may be transmitted to the system control unit 104 via the telemetry system 118. The control unit 104 may determine a distance, orientation and direction to the conductive target (for example, target well 142 or casing 140 of borehole 103) in the embodiment shown, based at least in part on the measurement of the induced magnetic field 136. For example, the system control unit 104 may use geometric algorithms to determine the distance, orientation and direction of the second borehole 103 relative to the borehole 106.

Figure 2:
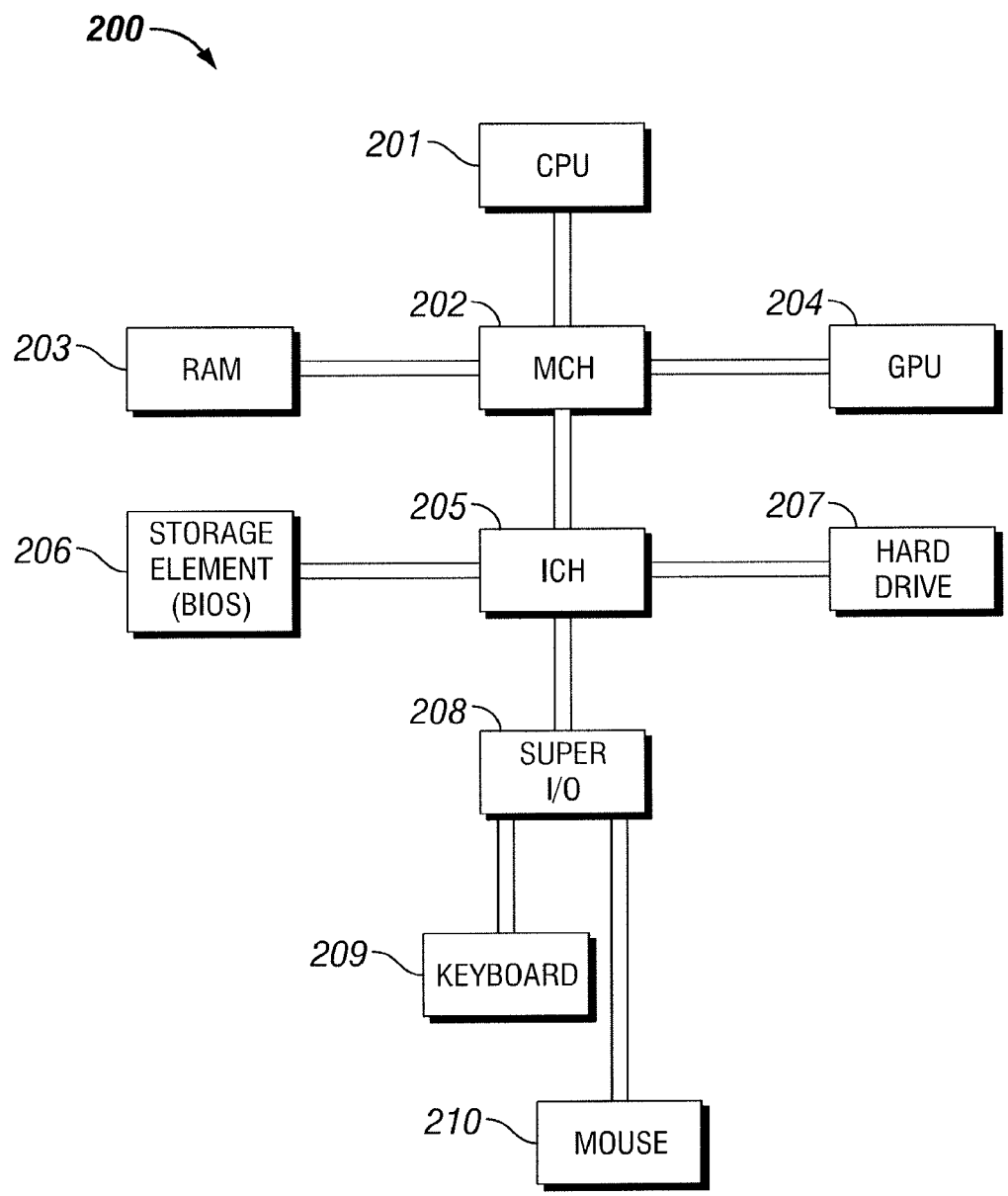
FIG. 2 is a diagram illustrating an example information handling system, according to aspects of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O huh 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, determining the distance and direction of the second borehole 103 relative to the first borehole 106 may be accomplished using the magnetic fields received by any one or more of the receivers 110. In certain embodiments, the distance and direction determination may be achieved utilizing the relationship in Equation (1) between the pipe current and the received magnetic fields.

$$\overline{H} = \frac{I}{2\pi r}\hat{\phi} \qquad \text{Equation (1)}$$

where H is the magnetic field vector, I is the current on the pipe 140, r is the shortest distance between the return electrode 130b and the casing 140; and φ is a vector that is perpendicular to both the z-axis of the receiver 110 and the shortest vector that connects the casing 140 to the return electrode 130b. Although Equation (1) assumes constant casing current along the casing, it can be extended to any current distribution by using the appropriate model.

In certain embodiments, the distance and direction of the second borehole 103 relative to the first borehole 106 may be determined using Equations (2) and (3), respectively.

$$r = \frac{I}{2\pi|\overline{H}|} \qquad \text{Equation (2)}$$

$$\Phi = \text{angle}(\hat{x}\cdot\overline{H}, \hat{y}\cdot\overline{H}) + 90 \qquad \text{Equation (3)}$$

where "·" is the vector inner-product operation. In certain instances, however, Equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4).

$$\frac{\partial \overline{H}}{\partial r} = -\frac{I}{2\pi r^2}\hat{\phi} \qquad \text{Equation (4)}$$

where ∂ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|} \qquad \text{Equation (5)}$$

Figure 3A:
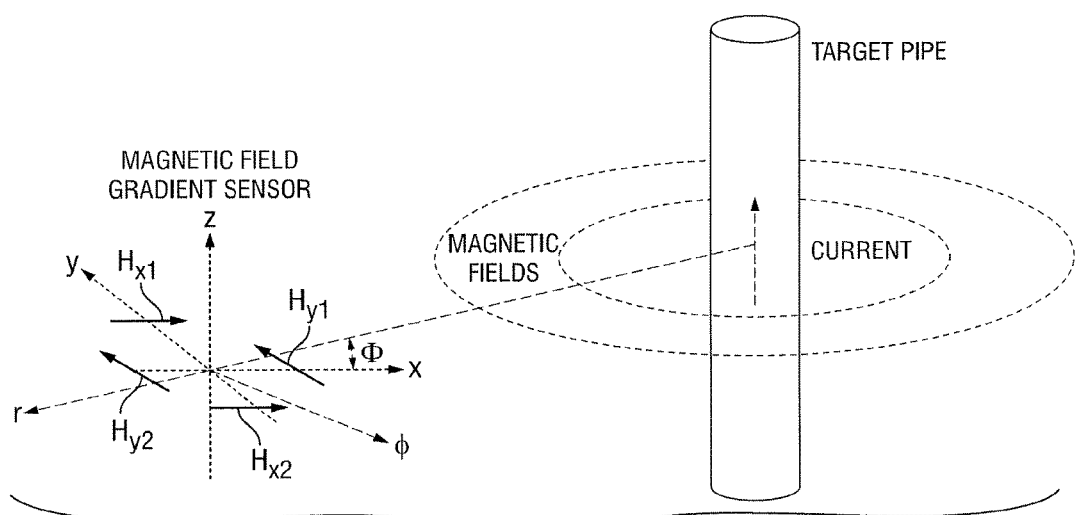
FIG. 3A is a diagram illustrating example gradient measurement components in relation to a target object and the magnetic fields produced by currents on the pipe.

In certain embodiments, the gradient field in Equation (5) may be realized in practice by utilizing finite difference of two magnetic field dipole measurements as shown below in Equation (6):

$$r = \frac{H_y}{\frac{H_y\left(x+\frac{\Delta x}{2},y\right) - H_y\left(x-\frac{\Delta x}{2},y\right)}{\Delta x}} \qquad \text{Equation (6)}$$

where $H_y$ and the gradient measurement components are illustrated in the 4-dipole configuration of FIG. 3A in relation to a target casing 140 and the magnetic fields produced by currents on the casing 140.

Figure 3B:
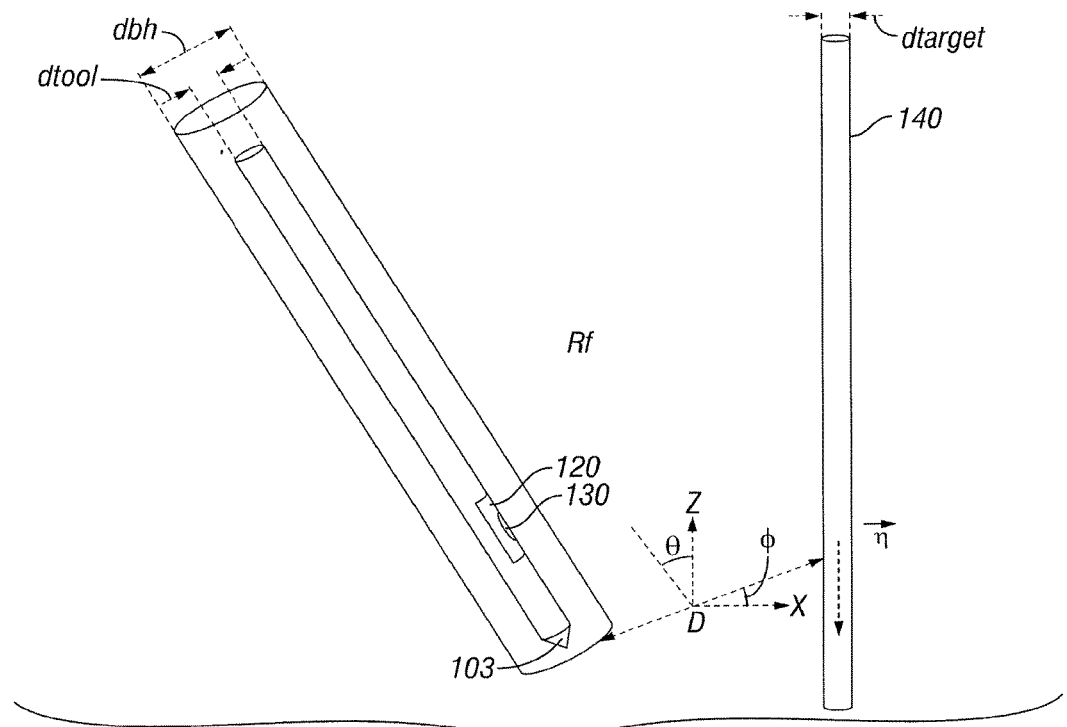
FIG. 3B is a diagram illustrating example ranging geometry, according to aspects of the present disclosure.

Directionality of the buttons 130 proposed in the present disclosure may increase the accuracy of the downhole tool, for example, the accuracy of a ranging tool. The ranging geometry according to aspects of the present disclosure is illustrated in FIG. 3B. Although no return electrode 130b is shown, it may be assumed that the button 130 is a source button 130a or a button 130 excited via toroidal excitation. FIG. 3B illustrates a ranging tool as the downhole tool 111 mounted on a LWD drilling assembly 107. A reference point on the target object (for example, casing 140) is at a D away from a reference point on the drilling assembly 107, which is illustrated in FIG. 3B as the tip of the drill bit 103. The inclination of the target object and the azimuth of the target object with respect to the downhole tool 111 are shown as θ and Φ, respectively. The direction of a unit vector parallel to the axis of the target object at the reference point is illustrated as $\vec{n}$. A ranging tool should determine all four parameters to correctly identify the ranging parameters, for example, direction, distance and orientation of a target object. An inversion algorithm may be used to aid in determining these ranging parameters. Other parameters may also require inversion, for example, Rm and diameter dbh, while the formation 102 is assumed to be homogeneous with a resistivity of Rf. These parameters may be determined with the assistance of other tools, such as a caliper sensor for dbh, a mud sensor for Rm and a resistivity tool that operates in tandem with the ranging tool having an Rf.

Directional information may be used in detecting the presence of a target object. When the target object is far away, the transmitted field patterns of the buttons 130 behave in a more nondirectional manner. Thus, it may not be possible to detect the presence of a target object by just looking at the variation of the received signal (the signal received after exciting the buttons 130) with azimuth. However, there may still be some sensitivity to direction which may aid the detection of the presence of the target object earlier than a traditional design.

A forward model, for example, a ranging model, of a downhole tool 111, borehole 106 and environment may be used to predict the measured signal (for example, magnetic field 136) at receivers 110 assuming no target object (or a target object at infinite distance). The modeled signal (or predicted signal) may be denoted as $\overline{M}^{\infty}$. The actual measured signal, $\overline{S}$, is subtracted from the modeled signal $\overline{M}^{\infty}$. For example, the magnitude of the measured signal $\overline{S}$ may be subtracted from the magnitude of the modeled signal $\overline{M}^{\infty}$. In one or more embodiments, the magnitude of one or more signals associated with the excitation of one or more buttons 130 is compared to the modeled signal $\overline{M}^{\infty}$. The norm of the error is compared with a threshold that is based on the downhole tool 111 and the environmental parameters. If a difference is larger than the threshold it may be concluded that a target object is present. When a target object is present, inversion may be used to determine the direction, distance and orientation of the target object with respect to the drilling well 141. In one or more embodiments, a drilling parameter is adjusted based, at least in part, on the determination of whether a target object is present. Inversion also uses a forward model of the downhole tool 111 for this purpose and tries to find the downhole tool 111, environment and the target object properties that would minimize a cost function. The cost function may include the error (for example, in the Euclidean norm sense) between the measured signal and the signal that is predicted by the forward model for a specific set of properties as well. However, additional regularization terms may be added to the cost function to increase its accuracy or to make it behave more smoothly.

Directional information may also be used to help inversion. In particular, directional information may be used to constrain the azimuthal position ($\Phi$) of the target object. This may be done by comparing the signal levels of different buttons 130 and by creating a regularization function R where a weight $w_i$ is assigned that is proportional to the magnitude of the received signal corresponding to each button 130. The value of the regularization function R is reduced if inverted $\Phi$ is closer to the direction of a button i ($\Phi_{bi}$) with a higher signal, where the total number of buttons is assumed to be N as illustrated by Equation (7).

$$R = \sum_{i=1}^{N} w_i \| \Phi - \Phi bi \|$$ Equation (7)

This regularization term may then be added to the cost function of the inversion. If the target object is not close to the downhole tool 111, buttons 130 may not have a large azimuthal sensitivity. A regularization function R would not impact the inversion significantly when the target object is far away as the signal level and the signal variation between signals due to different buttons 130 would be low. It may be desirable not to use the constraint on direction in inversion in such cases. In one or more embodiments, a drilling parameter is adjusted based, at least in part, on the cost value.

In one embodiment, an assessment of the presence of the target object may be made based on the level of the measured signals. If a target object is deemed to be not present based, at least in part, on one or more criteria, measurements may continue. If a target object is present based, at least in part, on one or more criteria, distance of the target may be estimated. If the target object is not close enough, directional information may not be used to estimate the distance to the target object. When the target object is close enough, a regularization term may be added to the inversion. When a target object is not close by, buttons 130 do not have a large azimuthal sensitivity. As the target object gets closer, field pattern of the buttons 130 become more directional and coupling with the conductive casing 140 (the target object) becomes more important than the formation current 134, especially for buttons facing the target object.

Further, power consumption may be a big concern for a downhole tool such as downhole tool 111. There is a limit on the amount of power that can be transmitted via a power cable which may then be shared with any number of tools of the drilling assembly 107. In some operations, power may be obtained from a battery downhole. Power transmitted in all azimuthal directions while the target object is in a particular azimuthal direction is a waste of power resources. Instead, directional excitation may be implemented where a higher power may be transmitted to the button(s) 130 that are facing the target object which creates a higher signal originating from the target object at the receivers 110. Directional excitation of the buttons 130 eliminates unnecessary noise coming from the buttons 130 not facing the target object.

Selection of the buttons 130 to excite may be based, at least in part, on the volume of sensitivity of each button 130. The volume of sensitivity may be stored in a memory in one or more formats such as a table, an array, an index, a database, a flat file, or any other format or storage known to one of ordinary skill in the art. The volume of sensitivity may be dependent on formation 102 and mud properties and may be based, at least in part, on the ranging parameters associated with the target object obtained from an inversion at a previous logging point. A button(s) 130 that is determined to be sensitive to the target object based, at least in part, on the volume of sensitivity, may be selected and only the button 130 or buttons 130 selected may be excited. Power to the selected button(s) 130 may be increased correspondingly based on how many buttons 130 are excited. In one or more embodiments, a non-azimuthal operation of the downhole tool 111 is maintained when a determined distance to the target object is larger than a sensitivity threshold where the threshold may be based, at least in part, on a volume of sensitivity associated with at least one button 130. In other embodiments, a button 130 may only be excited when the button 130 has an associated volume of sensitivity greater than a sensitivity threshold.

Figures 5A, 5B:
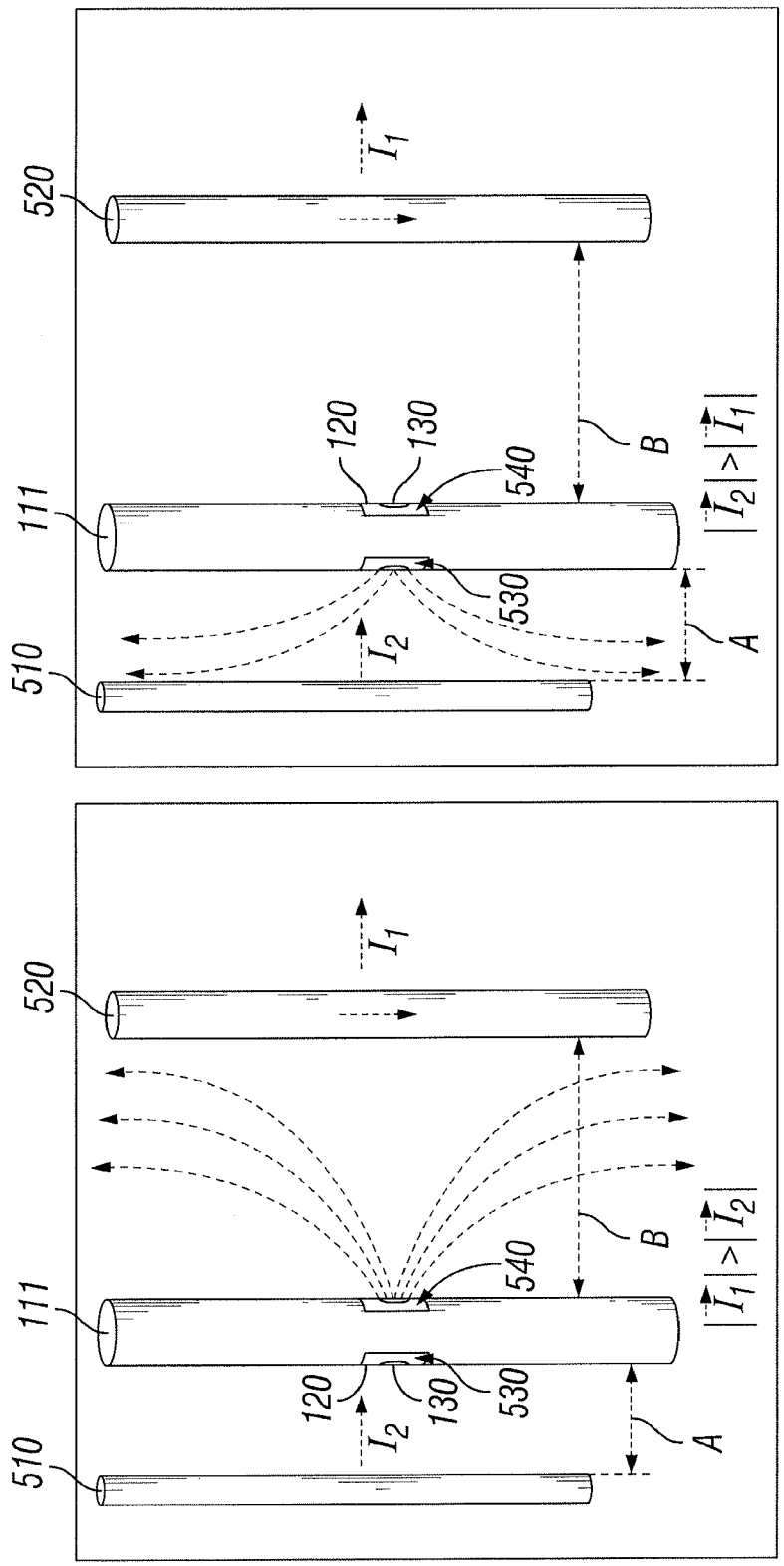
FIG. 5A and FIG. 5B are diagrams illustrating excitation of a button for determining presence of a target object, according to aspects of the present disclosure.

As illustrated in FIGS. 5A and 5B, multiple target objects (for example, 510 and 520) may be within a proximity to a downhole tool 111. In one or more embodiments, multiple target objects 510 and 520 (for example, multiple casings 140 associated with multiple target wells 142) may be within a ranging proximity to the downhole tool 111. For example, in crowded drilling fields or in SAGD type applications, multiple target objects may be in close proximity to each other. Directional excitation of buttons 130 may be utilized to distinguish the multiple target objects. For a multiple target object environment, a downhole tool 111 with multiple buttons located at different axial locations may provide the required angular resolution to determine one or more ranging parameters for the multiple target objects.

As illustrated in FIG. 5A, in one embodiment, a button 540 is located at first location on the downhole tool 111 and a button 530 is located at second location on the downhole tool 111. A target object 520 may located at a distance B from the button 540 and a target object 510 may be located at a distance A from button 530. When the button 540 is excited, the target object 520 will have a current with the greatest amplitude. As illustrated in FIG. 5B, in another embodiment, a button 530 may be excited. The target object 510 will have a current with a greater amplitude than the target object 520. The receivers 110 will receive different signals and these different signals may be used to determine the position of the multiple target objects. For example, the receivers may receive a stronger signal from target object 510 from excitation of button 530 than from target object 520 from excitation of button 540. The presence of multiple target objects may be incorporated in the forward model of an inversion. The directional sensitivity of each button 130 will automatically cause the inversion to perform better for a multiple target object environment. Approximate angular position may also be used to constrain the angular positions of the target objects or may be used without any inversion. The inversion may then return one or more ranging parameters associated with each of the target objects.

FIG. 4A, FIG. 4B, FIG. 4C and FIG. 4D are diagrams illustrating an example button excitation system 400a, 400b, 400c and 400d, respectively, according to one or more embodiments of the present disclosure. FIGS. 4A and 4C are cross-sectional views while FIGS. 4B and 4C are front views. FIGS. 4A and 4B are example button ranging systems using direct excitation of the button according to one or more aspects of the present disclosure. FIGS. 4C and 4D are example button ranging systems using toroidal excitation of the button according to one or more aspects of the present disclosure. Generally, mandrels or downhole tools 111 are made of metals which can withstand torque from twisting and rotational forces as well as forces due to the weight of the drilling assembly 107 itself.

Although slight variations may exist between different ranging tools that utilize direct excitation, generally such operate in a similar manner. An electrode is excited with a current or voltage source which causes the current to be emitted from a source electrode (for example, source button 130a) into the formation 102 through the mud. In general, and especially for logging-while-drilling tools, the drill string 108 or the mandrel of the downhole tool 111 (or ranging tool) is preferred to be metallic. A metallic downhole tool 111 increases the structural strength of the drill string 108, enables it to better resist the considerable stress caused by the weight of the drill string 108 and its torque and reduces mechanical failures. However, a metallic structure is electrically highly conductive. Since electrical current prefers to flow in the path of least resistance, the metallic structure itself as opposed to the formation 102 provides a more attractive path to a return button 130b. Thus, current emitted into the formation 102 is reduced by the amount of current that is emitted through the metallic structure. To prevent current from flowing through the metallic structure and to force current into the formation 102, insulating gap subs may be inserted in downhole tool 111. Although these gap subs prevent current flow along the metallic structure (for example, along BHA 109 or downhole tool 111), current may short to downhole tool 111 through the mud around the gap sub. Though some current is lost, a significant portion of the current may flow to the formation 102 compared to a configuration without the gap sub.

However, to insert a gap sub, it is necessary to physically separate the downhole tool 111 into multiple pieces and add an insulating material between these separated pieces. The resulting ranging tool or system has a weaker structural strength than a single piece tool without gap subs and may be more prone to mechanical failures. Also, in general, a variety of cables (for example, cables for telemetry and power transfer) run inside the tool and must pass through each gap sub. Accommodating the passage of these cables through each gap sub may present a design challenge as these cables must be fitted inside the gap sub. A higher incidence of failures of the tool or system may arise due to failure of the cables or interconnects that are on or around the gap subs. Difficulties may also be experienced, for example, in the production of a feasible deep ranging tool due to reduced performance or reliability issues.

A ranging tool according present disclosure that includes a button excitation system of any of 400a, 400b, 400c and 400d as illustrated in FIG. 4A, FIG. 4B, FIG. 4C, and FIG. 4D, respectively, is well adapted to attain the ends and advantages of a more reliable, more structurally stable and easier to manufacture ranging tool or downhole tool 111 and system as well as those that are inherent therein. Directional excitation of the buttons 130 or toroidal excitation of a button 130 may allow the orientation of a target object to be determined more accurately in ranging measurements. In one or more embodiments, once a target object is detected, only those buttons 130 facing the target object may be excited. Such directional excitation may optimize the power consumption of the downhole tool 111. Directional excitation may also aid in the detection of multiple target objects and to aid in distinguishing the multiple target objects. One or more embodiments may be utilized in LWD, MWD and wireline applications.

FIG. 4A, FIG. 4B, FIG. 4C and FIG. 4D each include buttons 130, isolation layers 120 and downhole tool 111. Isolation layer 120 comprises an insulation installed within a groove or recess of the downhole tool 111 with the button 130 installed within the isolation layer 120 such that the button 130 has no electrical contact to the downhole tool 111. In one or more embodiments, the isolation layers 120 and the buttons 130 are installed such that the top surfaces of the isolation layers 120 and the buttons 130 do not exceed the outer surface of the downhole tool 111. In other embodiments, the top surface of one or more of the isolation layers 120 and the buttons 130 may exceed the outer surface of the downhole tool 111 but such a design may experience greater wear and damage. In FIGS. 4A and 4B, the buttons 130 include a source button 130a and a return button 130b. As electrodes are essentially electric monopoles, electrodes need to have a return where the fields emanating from the source should be terminated. The source and return buttons in FIGS. 4A and 4 are buttons 130 located within an isolation layers 120 which are together located within a groove or recess of the mandrel or the downhole tool 111. Isolation layers 120 electrically isolate the buttons 130 and the metallic mandrel or downhole tool 111. The isolation layers 120 may completely fill the grooves or recesses or only a portion thereof.

In certain embodiments the number of source buttons 130a and the number of return buttons 130b are not the same. Isolation layers 120 provide effective isolation, comparable to that of a gap sub, to prevent direct coupling from buttons 130 to the downhole tool 111. As a result, the amount of current flowing through the mandrel or downhole tool 111 is reduced while the amount of current reaching the target object is increased. The designs illustrated in FIG. 4A, FIG. 4B, FIG. 4C and FIG. 4D may improve the structural strength or integrity and reliability of a direct excitation system 400 by eliminating the need for gap subs.

In FIGS. 4C and 4D, buttons 130 comprise buttons that are excited using toroidal excitation. The buttons 130 excited using toroidal excitation are in essence electric dipoles and do not require a return. Thus, isolation layers 120 may be present around the entire button 130 excited using toroidal excitation or only the cables carrying current but total isolation from the downhole tool 111 is not necessary. Because the button 130 excited using toroidal excitation does not require total isolation, the resulting installation of the button 130 excited using toroidal excitation and isolation layer 120 is smaller than the button excited using direct excitation configuration and thus the structural integrity of the downhole tool 111. The gain of the button 130 excited using toroidal excitation is proportional to the square of the frequency. Thus, the buttons 130 excited using toroidal excitation have very low gains at low frequencies which require operation of the buttons 130 excited using toroidal excitation at higher frequencies for the buttons 130 excited using toroidal excitation to be effective. Consideration of the attenuation of the electromagnetic fields in the formation 102 with the increase in frequency is required in designing a button 130 excited using toroidal excitation configuration.

The isolation layers 120 may have insulating properties that prevent contact between the downhole tool 111 and the buttons 130. The insulation provided by the isolation layer 120 prevents current from flowing through downhole tool 111 when the source button 130a or the button 130 excited using toroidal excitation is excited resulting in more current flowing into the formation 102. The isolation layer 120 may be of any thickness as required by the specific criteria for a given environment 100 or a given downhole tool 111. Each isolation layer 120 and button 130 may include an opening (for example, a hole or aperture) (not shown) to permit any cables to be fed from the downhole tool 111 through the isolation layer 120 to the button 130. For example, a source cable may be fed to the source button 130a or the button 130 excited using toroidal excitation from the downhole tool 111 through the isolation layer 120 via the opening so as to excite the source button 130a or the button 130 excited using toroidal excitation. The opening may be only as big as necessary to allow for the cabling. While one of ordinary skill in the art will recognize that the smaller the opening the greater the structural integrity of the downhole tool 111, the present disclosure contemplates any size opening as necessary for any embodiment. The buttons 130 may be installed within or affixed in any manner known to one of ordinary skill in the art, or any combination thereof.

As illustrated in FIGS. 4A through 4D, multiple buttons 130 may be placed along the same axial location. In other embodiments, multiple buttons 130 may be placed at different axial locations. In other embodiments, only one button 130 may be installed. The placement of the buttons 130 may depend on the goals of each distinct operation. The source button 130a and the return button 130b are placed at a distance sufficient to allow currents to flow into the formation 102 (for example, formation current 134). In one or more embodiments, the source button 130a and the return button 130b are placed at least two feet apart.

In certain embodiments, the isolation layers 120 have the same thickness throughout the axial length of the isolation layers 120 while in other embodiments, the isolation layers 120 have a varying thickness throughout the axial length of the isolation layers 120. In any embodiment, the isolation layers 120 and buttons 130 may be placed at any location along the downhole tool 111. In certain embodiments, the source button 130a is located above the return button 130b while in other embodiments, the return button 130b is located above the source button 130a. While FIGS. 4A through 4D depict buttons 130 and isolation layers 120 being the same size, in certain embodiments, buttons 130 and isolation layers 120 may vary such that source button 130a may have a different dimension than return button 130b. In certain embodiments, one or more button 130 may be located at the surface 105. For example, one of the return buttons 130b or the source buttons 130a may be located at the surface 105. In certain embodiments, a plurality of source buttons 130a and a plurality of return buttons 130b are located at any position along the downhole tool 111.

Figure 6:
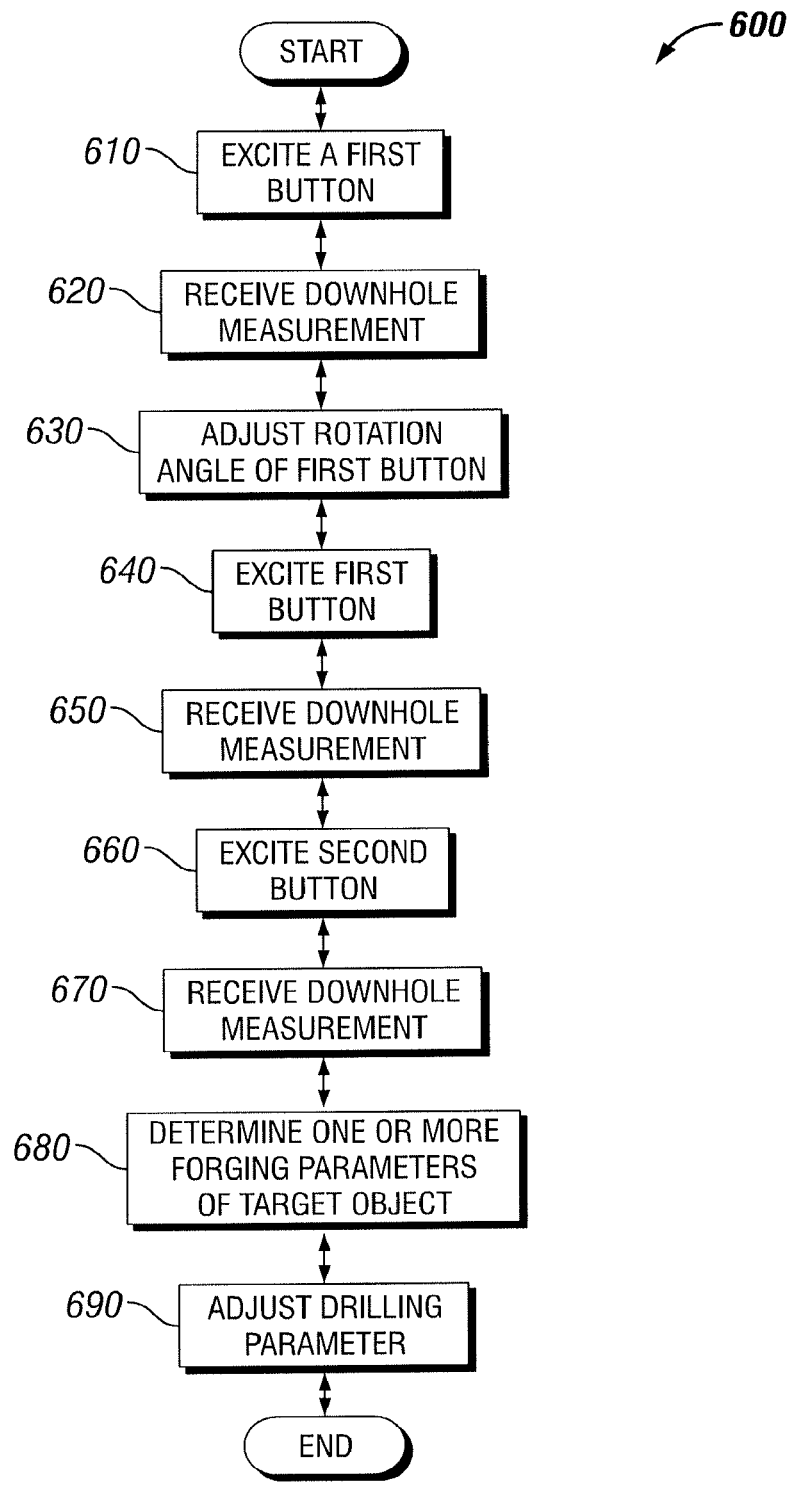
FIG. 6 is a flowchart of an example method for excitation of a button for a ranging application, according to aspects of the present disclosure.

FIG. 6 is a flowchart of an example method for excitation of a button for a ranging application according to aspects of the present disclosure. At step 610, a first button 130 located at a first position of a downhole tool 111 is excited by a first source. The downhole tool 111 is coupled to a drill string 108 and the first button is recessed within the downhole tool 111 such that a top surface of the first button 130 does not exceed an outer surface of the downhole tool 111. A first isolation layer 120 electrically isolates the first button 130 from the downhole tool 111. The button 130 may be excited using direct excitation or toroidal excitation as illustrated in FIGS. 4A and 4C, respectively. The downhole tool 111 may be a ranging tool mounted on a LWD drilling assembly 107.

At step 620, a first downhole measurement is received where the first downhole measurement is associated with the excitation of the first button 130. At step 630 a rotation angle of the first button 130 may be adjusted such that the first button 130 is directed to a different portion of the formation 102. At step 640 the first button is excited again and at step 650 a second downhole measurement is received where the second downhole measurement is associated with the second excitation of the first button.

At step 660 a second button 130 located at a second position on the downhole tool is excited by a second source. In one embodiment, the first source and the second source are the same source. In another embodiment, at least one of the first source and the second source may comprise a battery, a wireline, a power cable, a source at the surface 105, a source downhole, any other power source known to one of ordinary skill in the art, or any combination thereof. The second button 130 is recessed within the downhole tool 111 such that the top surface of the second button does not exceed the outer surface of the downhole tool 111. A first isolation layer 120 electrically isolates the first button 130 from the downhole tool 111. In one embodiment, the azimuthal axis of the second button 130 aligns with the azimuthal axis of the first button 130. In other embodiments, the azimuthal axis of the second button does not align with the azimuthal axis of the first button. In one embodiment, the first button 130 is located at a top portion of the downhole tool 111 and the second button 130 is located at a bottom portion of the downhole tool 111 or the positions are reversed. In one embodiment, the first button is located on a particular face of the downhole tool 111 and the second button is located on an opposite face of the downhole tool 111 (for example, 180 degrees apart). In other embodiments, multiple buttons 130 are located on the downhole tool equally spaced axially on the tool.

At step 670 a third measurement is received associated with the excitation of the second button 130. At step 680, one or more ranging parameters associated with a target object are determined based, at least in part, on any combination of the first measurement, the second measurement and the third measurement. At step 690, one or more drilling parameters are adjusted based, at least in part, on the determined ranging parameters where the ranging parameters include at least direction, distance and orientation of the target object.

In one or more embodiments, a method for downhole ranging within a formation comprises exciting a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool, receiving a first downhole measurement associated with the excitation of the first button, exciting a second button of the tool by a second source, wherein the second button is recessed within the tool such that a top surface of the second button does not exceed the outer surface of the tool, and wherein a second isolation layer electrically isolates the second button from the tool, receiving a second downhole measurement associated with the excitation of the second button, determining at least one of a direction, distance, and orientation to a target based, at least in part, on the first downhole measurement and the second downhole measurement and adjusting a drilling parameter based, at least in part, on the determined at least one of the direction, the distance, and the orientation to the target. In one or more embodiments, the method for downhole ranging within a formation further comprises adjusting a rotation angle of the first button, exciting the first button at the rotation angle, receiving a third downhole measurement associated with the excitation of the first button at the rotation angle and adjusting the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the method for downhole ranging within a formation further comprises comparing at least one of a first signal magnitude associated with the first button and a second signal magnitude associated with the second button to a predicted signal magnitude to obtain a first value, wherein the predicted signal magnitude is based, at least in part, on a ranging model, determining a presence of the target based, at least in part, on the first value exceeding a threshold and adjusting the drilling parameter based, at least in part, on the determining the presence of the target. In one or more embodiments, the method for downhole ranging within a formation further comprises determining a first weight associated with the first signal magnitude and a second weight associated with the second signal magnitude, determining a regularization value from a regularization function based, at least in part, on the first weight and the second weight, determining a cost value from a cost function based, at least in part, on the regularization value and adjusting the drilling parameter based, at least in part, on the cost value. In one or more embodiments, the predicted signal magnitude is based, at least in part, on no target being present. In one or more embodiments, the method for downhole ranging within a formation further comprises maintaining a non-azimuthal operation of the tool when a determined distance to a target is larger than a threshold. In one or more embodiments, the threshold is based, at least in part, on a volume of sensitivity associated with at least one of the first button and the second button. In one or more embodiments, the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

In one or more embodiments, a wellbore drilling system for drilling in a subsurface earth formation comprises a ranging tool coupled to a drill string, a first button recessed within the ranging tool such that a top surface of the first button does not exceed an outer surface of the ranging tool, a first isolation layer that electrically isolates the first button from the ranging tool, a second button recessed within the ranging tool such that a top surface of the second button does not exceed an outer surface of the ranging tool, a second isolation layer that electrically isolates the second button from the ranging tool and an information handling system communicably coupled to the ranging tool, the information handling system comprises a processor and memory device coupled to the processor, the memory device containing a set of instruction that, when executed by the processor, cause the processor to excite the first button of the ranging tool by a first source, receive a first downhole measurement associated with the excitation of the first button, excite a second button of the ranging tool by a second source, receive a second measurement associated with the excitation of the second button, determine at least one of a direction, distance, and orientation to a target based, at least in part, on the first downhole measurement and the second downhole measurement and adjust a drilling parameter based, at least in part, on the determined at least one of the direction, the distance, and the orientation to the target. In one or more embodiments, the set of instructions further cause the processor to adjust a rotation angle of the first button, excite the first button at the rotation angle, receive a third downhole measurement associated with the excitation of the first button at the rotation angle, and adjust the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the set of instructions further cause the processor to compare at least one of a first signal magnitude associated with the first button and a second signal magnitude associated with the second button to a predicted signal magnitude to obtain a first value, wherein the predicted signal magnitude is based, at least in part, on a ranging model, determine a presence of the target based, at least in part, on the first value exceeding a threshold and adjust the drilling parameter based, at least in part, on the determining the presence of the target. In one or more embodiments, the set of instructions further cause the processor to determine a first weight associated with the first signal magnitude and a second weight associated with the second signal magnitude, determine a regularization value from a regularization function based, at least in part, on the first weight and the second weight, determine a cost value from a cost function based, at least in part, on the regularization value and adjust the drilling parameter based, at least in part, on the cost value. In one or more embodiments, the predicted signal magnitude is based, at least in part, on no target being present. In one or more embodiments, the set of instructions further cause the processor to maintain a non-azimuthal operation of the tool when a determined distance to a target is larger than a threshold. In one or more embodiments, the threshold is based, at least in part, on a volume of sensitivity associated with at least one of the first button and the second button. In one or more embodiments, the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

In one or more embodiments, a non-transitory computer readable medium storing a program that, when executed, causes a processor to excite a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool, receive a first downhole measurement associated with the excitation of the first button, excite a second button of the tool by a second source, wherein the second button is recessed within the tool such that a top surface of the second button does not exceed the outer surface of the tool, and wherein a second isolation layer electrically isolates the second button from the tool, receive a second downhole measurement associated with the excitation of the second button, determine at least one of a direction, distance, and orientation to a target based, at least in part, on the first downhole measurement and the second downhole measurement and adjust a drilling parameter based, at least in part, on the determined at least one of the direction, the distance, and the orientation to the target. In one or more embodiments, the program, when executed, causes the processor to adjust a rotation angle of the first button, excite the first button at the rotation angle, receive a third downhole measurement associated with the excitation of the first button at the rotation angle, and adjust the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the program, when executed, causes the processor to compare at least one of a first signal magnitude associated with the first button and a second signal magnitude associated with the second button to a predicted signal magnitude to obtain a first value, wherein the predicted signal magnitude is based, at least in part, on a ranging model, determine a presence of the target based, at least in part, on the first value exceeding a threshold and adjust the drilling parameter based, at least in part, on the determining the presence of the target. In one or more embodiments, the program, when executed, causes the processor to determine a first weight associated with the first signal magnitude and a second weight associated with the second signal magnitude, determine a regularization value from a regularization function based, at least in part, on the first weight and the second weight, determine a cost value from a cost function based, at least in part, on the regularization value and adjust the drilling parameter based, at least in part, on the cost value. In one or more embodiments, the predicted signal magnitude is based, at least in part, on no target being present. In one or more embodiments, the program, when executed, causes the processor to maintain a non-azimuthal operation of the tool when a determined distance to a target is larger than a threshold. In one or more embodiments, the threshold is based, at least in part, on a volume of sensitivity associated with at least one of the first button and the second button. In one or more embodiments, wherein the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for downhole ranging within a formation, the method comprising:
    exciting a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool;
    receiving a first downhole measurement associated with the excitation of the first button;
    exciting a second button of the tool by a second source, wherein the second button is recessed within the tool such that a top surface of the second button does not exceed the outer surface of the tool, wherein a second isolation layer electrically isolates the second button from the tool, and wherein the first isolation layer and the second isolation layer isolates the first button and the second button from the tool without requiring a gap sub;
    receiving a second downhole measurement associated with the excitation of the second button;
    comparing at least one of a first signal magnitude associated with the first button and a second signal magnitude associated with the second button to a predicted signal magnitude to obtain a first value, wherein the predicted signal magnitude is based, at least in part, on a ranging model;
determining at least one of a direction, distance, and orientation to a target based, at least in part, on the first value exceeding a threshold; and
adjusting a drilling parameter based, at least in part, on the determined at least one of the direction, the distance, and the orientation to the target.

2. The method of claim 1, further comprising:
adjusting a rotation angle of the first button;
exciting the first button at the rotation angle;
receiving a third downhole measurement associated with the excitation of the first button at the rotation angle; and
adjusting the drilling parameter based, at least in part, on the third downhole measurement.

3. The method of claim 1, wherein an azimuthal axis of the second button aligns with an azimuthal axis of the first button.

4. The method of claim 1, wherein the first button and the second button are recessed in a groove of the tool.

5. The method of claim 1, further comprising:
determining a first weight associated with the first signal magnitude and a second weight associated with the second signal magnitude;
determining a regularization value from a regularization function based, at least in part, on the first weight and the second weight;
determining a cost value from a cost function based, at least in part, on the regularization value; and
adjusting the drilling parameter based, at least in part, on the cost value.

6. The method claim 1, wherein the predicted signal magnitude is based, at least in part, on no target being present.

7. The method of claim 1, further comprising:
maintaining a non-azimuthal operation of the tool when a determined distance to a target is larger than the threshold.

8. The method of claim 7, wherein the threshold is based, at least in part, on a volume of sensitivity associated with at least one of the first button and the second button.

9. The method of claim 1, wherein the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point.

10. The method of claim 1, wherein at least one of the first button and the second button comprise an electrode.

11. The method of claim 1, wherein at least one of the first button and the second button comprise a toroidal winding.

12. A wellbore drilling system for drilling in a subsurface earth formation, comprising:
a ranging tool coupled to a drill string;
a first button recessed within the ranging tool such that a top surface of the first button does not exceed an outer surface of the ranging tool;
a first isolation layer that electrically isolates the first button from the ranging tool;
a second button recessed within the ranging tool such that a top surface of the second button does not exceed an outer surface of the ranging tool;
a second isolation layer that electrically isolates the second button from the ranging tool, wherein the first isolation layer and the second isolation layer isolates the first button and the second button from the tool without requiring a gap sub; and
an information handling system communicably coupled to the ranging tool, the information handling system comprises a processor and memory device coupled to the processor, the memory device containing a set of instruction that, when executed by the processor, cause the processor to:
excite the first button of the ranging tool by a first source;
receive a first downhole measurement associated with the excitation of the first button;
excite a second button of the ranging tool by a second source;
receive a second measurement associated with the excitation of the second button;
compare at least one of a first signal magnitude associated with the first button and a second signal magnitude associated with the second button to a predicted signal magnitude to obtain a first value, wherein the predicted signal magnitude is based, at least in part, on a ranging model;
determine at least one of a direction, distance, and orientation to a target based, at least in part, on the first value exceeding a threshold; and
adjust a drilling parameter based, at least in part, on the determined at least one of the direction, the distance, and the orientation to the target.

13. The wellbore drilling system of claim 12, wherein the set of instructions further cause the processor to:
adjust a rotation angle of the first button;
excite the first button at the rotation angle;
receive a third downhole measurement associated with the excitation of the first button at the rotation angle; and
adjust the drilling parameter based, at least in part, on the third downhole measurement.

14. The wellbore drilling system of claim 12, wherein an azimuthal axis of the second button aligns with an azimuthal axis of the first button.

15. The wellbore drilling system of claim 12, wherein the first button and the second button are recessed in a groove of the tool.

16. The wellbore drilling system of claim 12, wherein the set of instructions further cause the processor to:
determine a first weight associated with the first signal magnitude and a second weight associated with the second signal magnitude;
determine a regularization value from a regularization function based, at least in part, on the first weight and the second weight;
determine a cost value from a cost function based, at least in part, on the regularization value; and
adjust the drilling parameter based, at least in part, on the cost value.

17. The wellbore drilling system of claim 12, wherein the predicted signal magnitude is based, at least in part, on no target being present.

18. The wellbore drilling system of claim 12, wherein the set of instructions further cause the processor to:
maintain a non-azimuthal operation of the tool when a determined distance to a target is larger than the threshold.

19. The wellbore drilling system of claim 18, wherein the threshold is based, at least in part, on a volume of sensitivity associated with at least one of the first button and the second button.

20. The wellbore drilling system of claim 12, wherein the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point.

21. The wellbore drilling system of claim 12, wherein at least one of the first button and the second button comprise an electrode.

22. The wellbore drilling system of claim 12, wherein at least one of the first button and the second button comprise a toroidal winding.

23. A non-transitory computer readable medium storing a program that, when executed, causes a processor to:
excite a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool;
receive a first downhole measurement associated with the excitation of the first button;
excite a second button of the tool by a second source, wherein the second button is recessed within the tool such that a top surface of the second button does not exceed the outer surface of the tool, wherein a second isolation layer electrically isolates the second button from the tool, and wherein the first isolation layer and the second isolation layer isolates the first button and the second button from the tool without requiring a gap sub;
receive a second downhole measurement associated with the excitation of the second button;
compare at least one of a first signal magnitude associated with the first button and a second signal magnitude associated with the second button to a predicted signal magnitude to obtain a first value, wherein the predicted signal magnitude is based, at least in part, on a ranging model;
determine at least one of a direction, distance, and orientation to a target based, at least in part, on the first value exceeding a threshold; and
adjust a drilling parameter based, at least in part, on the determined at least one of the direction, the distance, and the orientation to the target.

24. The non-transitory computer readable medium of claim 23, wherein the program, when executed, causes the processor to:
adjust a rotation angle of the first button;
excite the first button at the rotation angle;
receive a third downhole measurement associated with the excitation of the first button at the rotation angle; and
adjust the drilling parameter based, at least in part, on the third downhole measurement.

25. The non-transitory computer readable medium of claim 23, wherein an azimuthal axis of the second button aligns with an azimuthal axis of the first button.

26. The non-transitory computer readable medium of claim 23, wherein the first button and the second button are recessed in a groove of the tool.

27. The non-transitory computer readable medium of claim 23, wherein the program, when executed, causes the processor to:
determine a first weight associated with the first signal magnitude and a second weight associated with the second signal magnitude;
determine a regularization value from a regularization function based, at least in part, on the first weight and the second weight;
determine a cost value from a cost function based, at least in part, on the regularization value; and
adjust the drilling parameter based, at least in part, on the cost value.

28. The non-transitory computer readable medium of claim 23, wherein the predicted signal magnitude is based, at least in part, on no target being present.

29. The non-transitory computer readable medium of claim 23, wherein the program, when executed, causes the processor to:
maintain a non-azimuthal operation of the tool when a determined distance to a target is larger than the threshold.

30. The non-transitory computer readable medium of claim 29, wherein the threshold is based, at least in part, on a volume of sensitivity associated with at least one of the first button and the second button.

31. The non-transitory computer readable medium of claim 23, wherein the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point.

32. The non-transitory computer readable medium of claim 23, wherein at least one of the first button and the second button comprise an electrode.

33. The non-transitory computer readable medium of claim 23, wherein at least one of the first button and the second button comprise a toroidal winding.

* * * * *